United States Patent [19]

Ligh

[11] Patent Number: 4,991,620

[45] Date of Patent: Feb. 12, 1991

[54] TANK BLANKETING VALVE

[76] Inventor: Jone Yen Ligh, 12634 Ashford Pine Dr., Houston, Tex. 77082

[21] Appl. No.: 554,550

[22] Filed: Jul. 19, 1990

Related U.S. Application Data

[63] Continuation of Ser. No. 352,619, May 15, 1989, which is a continuation of Ser. No. 213,928, Jun. 30, 1988, abandoned.

[51] Int. Cl.$^5$ .............................................. F16K 31/38
[52] U.S. Cl. .................................. 137/489; 137/492.5; 251/282
[58] Field of Search ..................... 137/489, 492, 492.5; 251/282

[56] References Cited

U.S. PATENT DOCUMENTS

| | | | |
|---|---|---|---|
| 1,724,891 | 8/1929 | Anderson . | |
| 2,731,033 | 1/1956 | Cable | 137/494 |
| 2,841,173 | 7/1958 | Masom et al. | 137/505.18 |
| 3,092,133 | 6/1963 | Clark | 137/220 |
| 3,529,622 | 9/1970 | Weise et al. | 137/329.02 |
| 3,920,040 | 11/1975 | Powell | 137/458 |
| 3,934,607 | 1/1976 | Revesz | 137/489.5 |
| 3,977,423 | 8/1976 | Clayton | 137/12 |
| 4,172,466 | 10/1979 | Pattarini et al. | 137/488 |
| 4,228,819 | 10/1980 | Kruse et al. | 137/489 |
| 4,274,440 | 6/1981 | Richard, Jr. | 137/613 |
| 4,388,940 | 6/1983 | Powell | 137/70 |
| 4,425,938 | 1/1984 | Papa et al. | 137/489 |
| 4,429,709 | 2/1984 | Niskanen | 137/220 |
| 4,445,531 | 5/1984 | Powell | 137/489 |
| 4,463,776 | 8/1984 | Hewlett | 137/495 |
| 4,632,143 | 12/1986 | McNeely | 137/488 |
| 4,674,530 | 6/1987 | Bickford | 137/469 |
| 4,791,956 | 12/1988 | Kominami et al. | 137/503 |

OTHER PUBLICATIONS

Appalachian Controls Co. Brochure "Inert Gas Blanketing System", rev. 1-4/83.
Anderson, Greenwood & Co. Brochure "AGCO Trans-Zero Regulators for Tank Blanketing Service" Catalog 7000, Feb. 1982.
"Fisher Governor Brochure" Aug. 1980.

Primary Examiner—Alan Cohan
Attorney, Agent, or Firm—Kenneth H. Johnson

[57] ABSTRACT

A tank blanketing valve in which a biased piston is positioned to control the flow of source gas into the tank. The piston is biased by a spring and a pilot gas stream from the source gas (the biasing pressure of force) to close the tank gas inlet. The pilot gas stream is controlled by a pressure sensing component of the valve, whereby the pilot gas stream is directed away from the biased piston when the pressure in the tank is less than a predetermined pressure. This reduces the biasing pressure which is holding the piston in the gas inlet line to the tank. The pressure of the source gas on the piston in the source gas inlet line then exceeds the biasing pressure and causes the piston to slide open and admit source gas into the tank. When the pressure in the tank reaches the predetermined level the pressure sensing component responds and allows the pilot gas stream to be redirected to the piston and thereby to combine with the biasing pressure of the spring which then exceeds the pressure of the source gas in the inlet, forcing the piston to close off the inlet to any further flow of source gas into the tank.

15 Claims, 3 Drawing Sheets

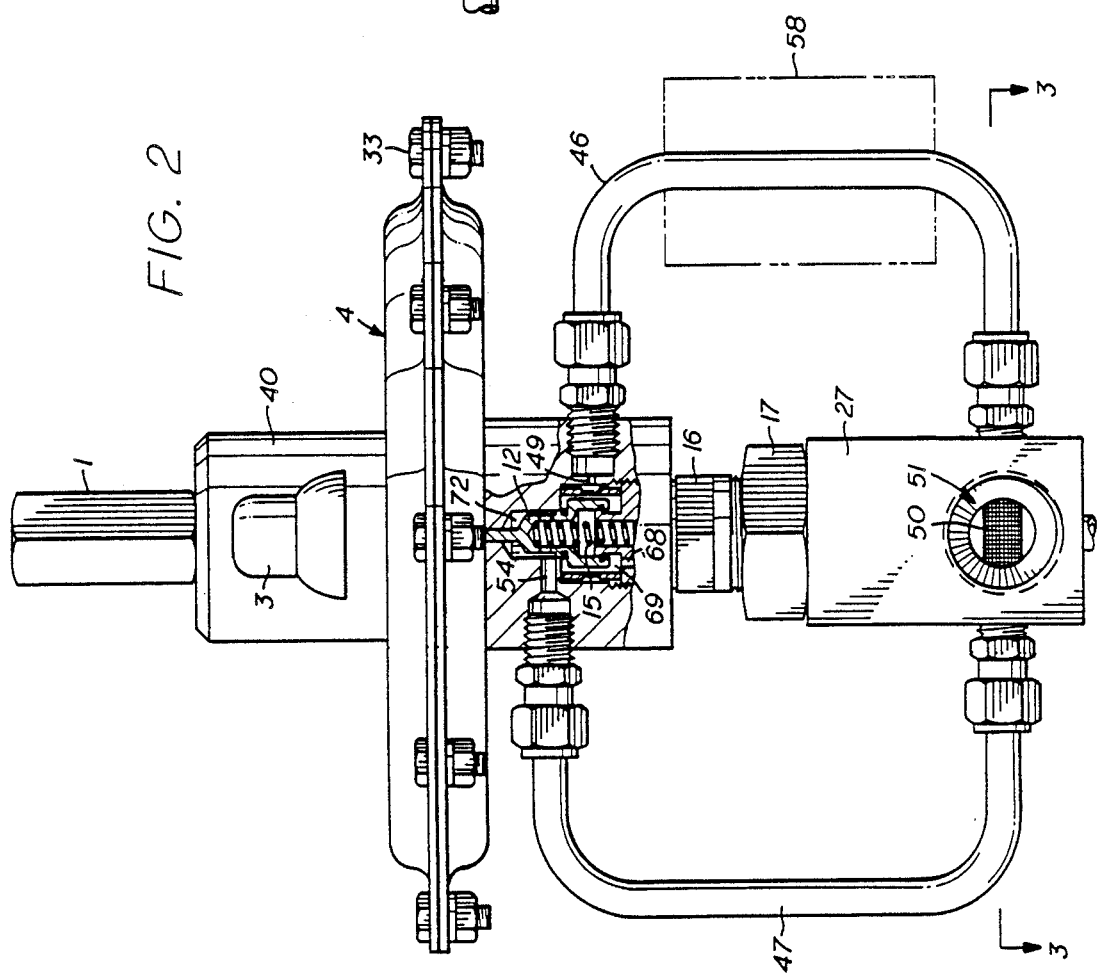

TANK BLANKETING VALVE

This application is a continuation of U.S. Ser. No. 07/352,619 filed May 15, 1989 which is a continuation of 07/213,928, filed June 30, 1988, now abandoned.

BACKGROUND OF THE INVENTION

1. Field of the Invention

The present invention relates to a device which will automatically admit a gas as needed into the space above the liquid level of a sealed storage vessel. More specifically the device is a valve and generally inert gases are admitted into low pressure liquid storage vessels to blanket the liquid. A tank blanketing valve is a device which will automatically admit a gas, usually inert (such as nitrogen), as needed into the space above the liquid level of a sealed low pressure liquid storage vessel. Many storage tanks are sealed because the liquid contents often emit hazardous vapors into the atmosphere. One reason for a blanket is to prevent a vacuum and collapse of the tank when a vacuum tends to form due to one of several reasons; cooling of the tank walls at nights or during a sudden rain on a hot day, and/or when the liquid contents are being withdrawn. Another reason for a blanket of inert gas is to maintain product integrity by keeping out air, which contains moisture and some elements that could cause an undesirable chemical reaction with the stored contents.

2. Related Art

Gas blanketing is the injection of a protective gas blanket into the vapor space in liquid storage tanks. Typical locations of application are petroleum refineries, storage depots, and chemical plants.

The purpose of gas blanketing is to maintain an artificial atmosphere above the liquid in storage to prevent the entrance of air which, due to its oxygen content, can cause corrosion of the tank or react with the liquid and to prevent the entrance of atmospheric moisture with its resultant condensation. The product in storage will dictate the gas used, the most common being oxygen free nitrogen. The usual pressures employed are very low-being on the order of less than 1" water column (WC). Typical pressures are 0.5" WC. The pressure is held at all times including constant liquid level or during liquid withdrawal. During liquid withdrawals the volume removed is replaced with the inert gas to maintain a constant pressure and complete blanketing. Likewise with sudden drops in tank pressure due to atmospheric conditions such as sudden rain shower the inert gas is added.

Most existing blanketing valves are regulators modified for tank blanketing use. For example, U.S. Pat. No. 4,274,440 describes such a system using such regulators. A specific device used for this purpose for many years is described in U.S. Pat. No. 3,529,622. Again this particular valve is a pressure regulator adapted for the blanketing use.

It is an advantage of the present invention that a new valve is provided which is specifically designed for the purpose of gas blanketing. A further advantage is a minimum of piping. It is a feature of the present invention that the valve opens and closes as required to maintain a predetermined blanket pressure. A further feature is that the valve is pilot operated to minimize the pressure spread between lock-up and full open, thereby maintaining a closely controlled blanket pressure. A further advantage is the elimination of an expensive molded elastomeric diaphragm and the need to replace such diaphragm.

A particular advantage of the present invention is the replacement of extensive regulator systems with a single device. These and other advantages and features will become apparent from the following.

SUMMARY OF THE INVENTION

Briefly the present invention is a blanketing valve which controls and maintains the blanketing gas in a tank constant by having a piston positioned to block off the connection between the gas inlet from the gas source and to the tank by biasing the piston, with a first biasing means, preferably a spring, and with a pilot gas stream from the gas source. The valve also has means for sensing the pressure in the tank. When the pressure in the tank is less than a predetermined amount, a pilot stream control means is actuated to reduce the pilot gas to the piston (from the biased side), that is, the biasing pressure is reduced to less than the pressure of the gas source, thus the piston is forced open by the gas source, which flows into the tank. Possibly a different method of viewing this operation is that substantial elimination of the pilot gas stream from the biased side of the piston results in an area of lower pressure being created, compared to the other side of the piston which is being subjected to pressure of the gas (from the gas source), hence the slidable piston tends to go the area of lower pressure.

When the pressure in the tank rises to the predetermined level, the sensing means actuates the pilot stream control means to readmit the pilot gas to the piston (biased side) whereby the combined pressure of the pilot gas stream (same as gas source) and the other biasing means, e.g., a spring, is greater than the pressure of the gas source alone and the piston is forced to block off the gas inlet from gas outlet and the pressure in the tank is stabilized at the predetermined level. The operation of the valve is continuous, that is, the above operation is repeated each time there is a drop in the tank pressure from the predetermined pressure. An increase of the pressure in the tank has no effect on the present valve.

BRIEF DESCRIPTION OF THE DRAWINGS

FIG. 2 is an elevational view of FIG. 1 rotated 90° right to left with a partial cross section.

FIG. 3 is a view along line 3—3 of FIG. 2.

DETAILED DESCRIPTION AND PREFERRED EMBODIMENT

Figure 1:
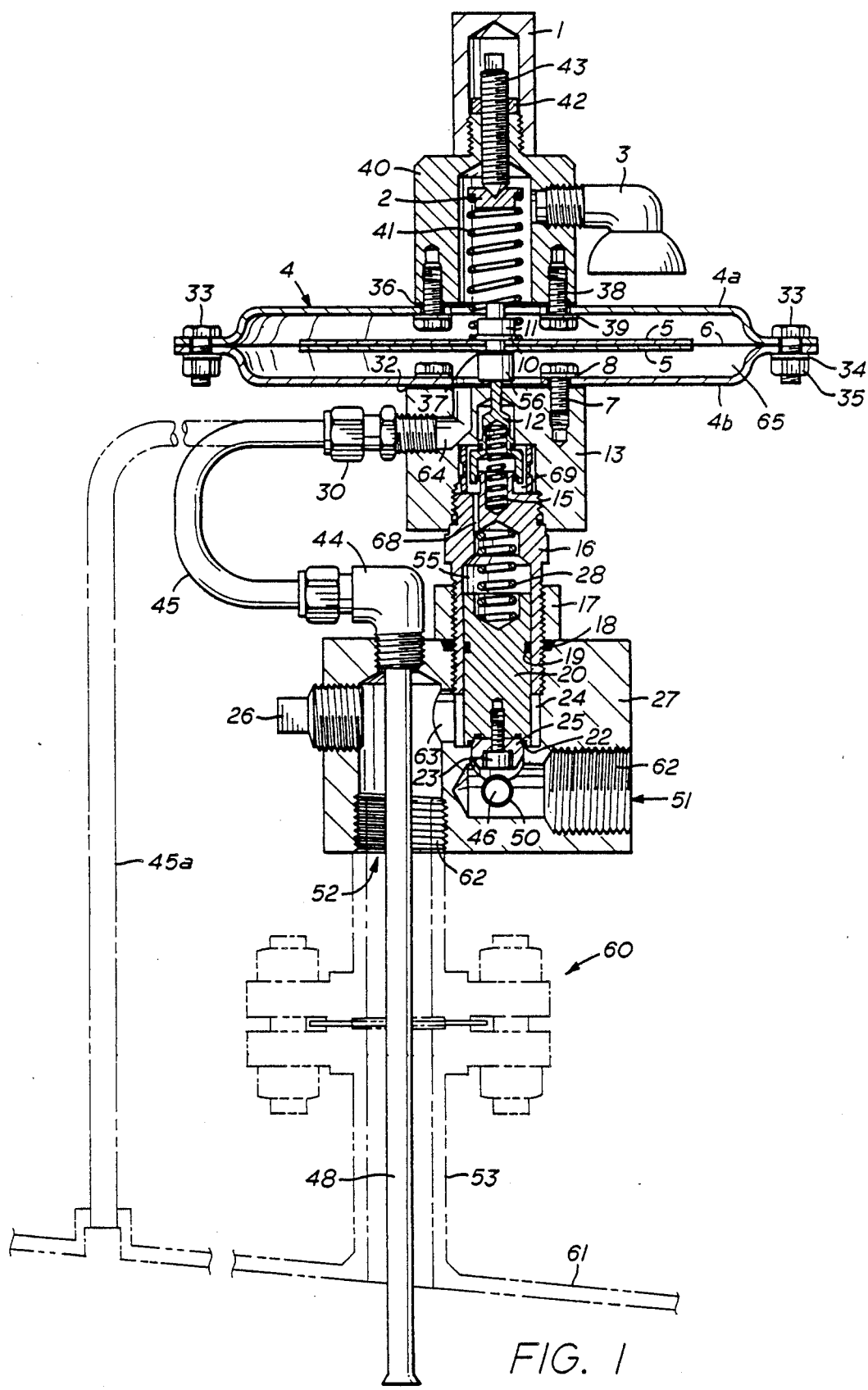
FIG. 1 is an elevational cross sectional view of the present valve.
Figure 5:
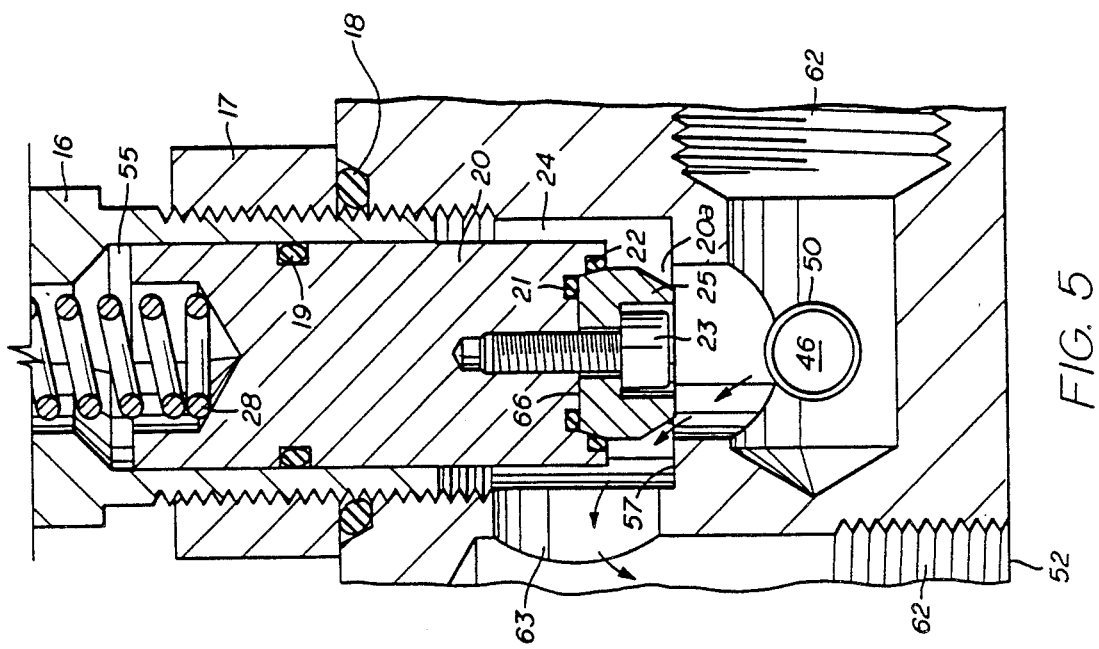
FIG. 5 is an enlarged cross sectional view showing the piston in the "open" position.
Figure 4:
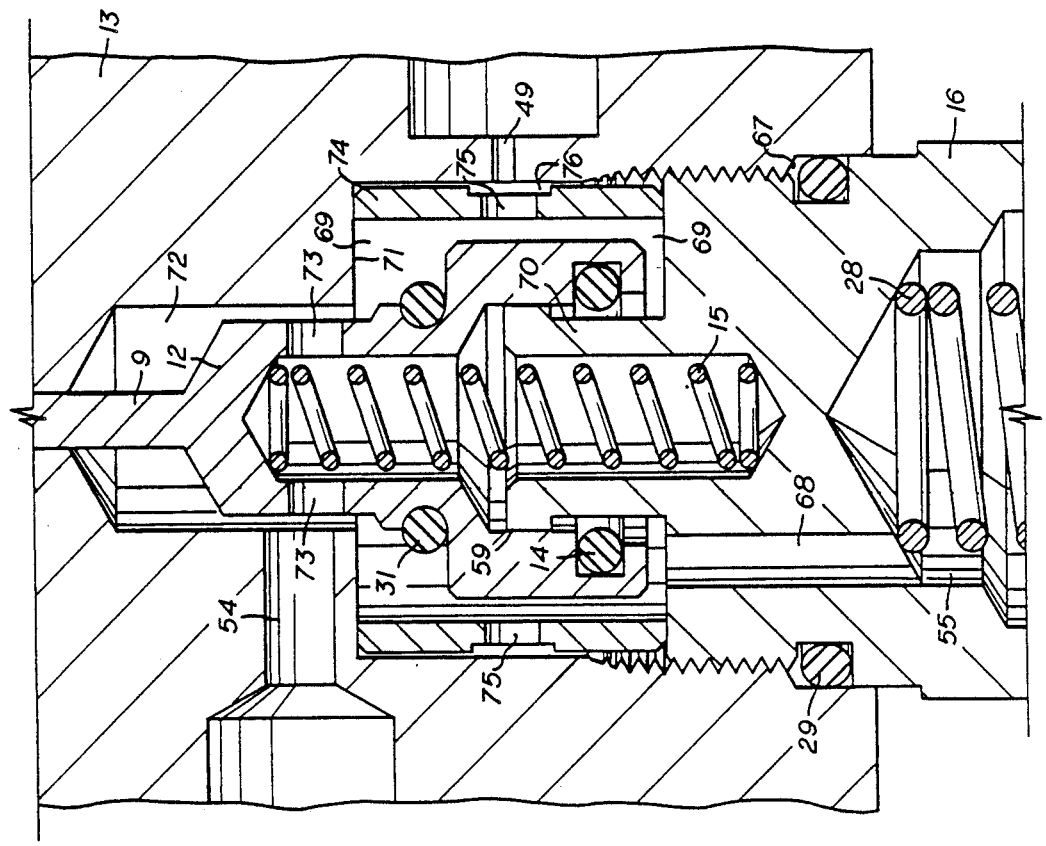
FIG. 4 is an enlarged cross sectional view of the pilot valve boby showing the configuration of the pilot valve when the piston is in the "open" position.

In FIG. 1 the blanketing valve of the present invention is shown mounted to tank 61 on tank inlet tube 53 by bolt, flange and seal system 60, all shown in phantom outline since they are not part of the invention other than setting the environment therefor. The embodiment depicted in the drawings is that preferred principally for simplification of the manufacturing.

The main valve body 27 has a blanketing gas outlet 52 suitably adapted with threads 62 or other means to attach it to the tank inlet tube. A gas inlet 51 is also provided in the main valve body. The pipe plug 26 is merely a manufacturing residual from the drilling of conduit 63 which connects the gas outlet 52 to the bore of connector 16 which is sealed by piston 20. When piston 20 is drawn upward the bore 20a allows gas inlet 51 to communicate with gas outlet 52. In a preferred embodiment a sense tube 48 is mounted through main valve body 27, gas outlet 52 and the tank inlet tube 53. Alternatively a sense tube 45a (dotted lines) could be mounted external of the main valve body. The sense tube 48 is mounted in the upper end of the gas outlet by means of threaded elbow tube fitting 44, which is connected by sense tube loop 45 (and tube fitting 30) to conduit 64 which connects with pressure sensing chamber 65.

Threadably mounted in main valve body 27 in bore 24 is connector 16 which is secured in place by jam nut 17 and sealed against gas leaks by connector seal 18. The connector 16 has a bore 20a in which the piston 20 is slidably mounted with piston seal 19, and biased downward by spring 28 and gas from the pilot inlet tube 46, thereby interrupting the conduit between the gas inlet 51 and the tank outlet 52.

At the lower terminus of piston 20 flow plug 25 (metal to metal) is mounted by means of countersunk screw 23 into a recess 66 in piston 20 against flow plug seal 21 (internal seal). Seat seal 22 runs about the recess adjacent to the flow plug 25 and seats against the main valve body 27 on annular shoulder 57 in the closed position shown in FIG. 1.

The upper end of the connector 16 is threadably engaged in bore 67 in pilot valve body 13 with pilot body seal 29, and positioned by spacer 74, which has openings 75 and annular gas channel 76. A conduit 68 throughconnector 16 connects the dome 55 to annular space 69 which communicates with the inlet pilot tube (FIG. 2) via orifice 49, thereby providing a gas pressure equal to that of the gas at inlet 51 on to piston 20 and maintaining it in the down or closed position. The pilot spindle 12 is rectilinearly and slidably mounted on a neck 70 of connector 16, has a gas tight seal formed at spindle seat 31 and seals against shoulder 71 of bore 67, when the system is "closed" because the gas pressure in the tank is equal to pressure of the predetermined setting. Lower spindle seal 14 seals against annular lip 59 on neck 70. Hence the annular space 69 is isolated from head space 72 which communicates via pilot discharge orifice 54 and pilot discharge tube 47 to gas outlet 52 and is static when the piston 20 is closed (FIGS. 1 and 2). The pilot spindle 12 is biased by spring 15 upward and a conduit 73 is provided to connect the chamber where spring 15 is located to head space 72.

The pilot spindle has a rectilinear extension 9 extending out of the pilot valve body and into diaphragm case 4 (comprised of upper and lower halves 4a and 4b respectively joined together by bolts 33, lock washers 34 and nuts 35). The case 4 is affixed over gasket 32 to the pilot valve body by bolts 7 and lock washers 8. Extending laterally through the center of the case 4 and clasped about its periphery by the sealed halves 4a and 4b of the case is diaphragm 6 with support plates 5 (upper and lower) extending from the center of the diaphragm with gasket 37 and are held in place by nuts 11 and lockwasher 10 threadably mounted on bolt 56. Bolt 56 also abuts extension 9 which will force spindle 12 downward when the pressure in the tank drops.

Spring bonnet 40 is mounted with weather gasket 36 to half 4a by bolts 38 and lockwasher 39. The bonnet 40 communicates with the atmosphere breather vent 3.

A set pressure spring 41 is mounted in the bonnet and seated against the upper support plate 5. Located in the top of spring 4 is button 2. Adjusting screw 43 is threaded through the bonnet and acts against button 2 to adjust the tension on spring 41 and select the pressure of gas in the tank. Once set the adjusting screw is locked in place with jam nut 42 and covered with cap 1.

Preferably there will be a filter 50 on the pilot inlet tube and optionally a second filter 58 in the same line to protect against inclusion of any foreign material into the sensitive mechanism of the present invention.

Blanket gas is admitted to the main valve body 27 inlet 51. Inlet gas pressure, usually 30–200 psig, is channeled to the pilot valve body 13 through the pilot inlet tube 46 and the orifice 49, and directed to the space or "dome" 55, that is above the piston 20. The piston seal 19 creates a sealed area above the piston that is larger than the area below the piston at the seat seal 22. Whenever the pressure in the dome equals the pressure under the seat seal 22 and around the flow plug 25 in the inlet cavity, the piston will move downward to close the valve due to the existence of a higher force pushing down on top of the piston 20 than the force pushing up at the seat seal 22. Closing is assisted by the piston spring 28. Whenever the pressure in the dome above the piston 20 is reduced to a point when the total downward force, created both by pressure and the piston spring 28, is less than the upward force, created by the inlet pressure acting on the area under the seat seal 22, the valve will open and allow some inlet gas to flow downstream.

The pressure sensing chamber 65 is created by the diaphragm 6 and the lower diaphragm case 4b. Through connecting passages, the pressure in the storage tank is communicated to the pilot sensing chamber through either a remote sense line 45a or the internal sense tube 48. The internal sense tube, if used, must protrude below the tank roof to sense the true tank pressure. When the valve is open and flowing, the pressure in the vicinity of pipe plug 26 in the outlet cavity of the main valve body 27 is much greater than the tank pressure. Sensing at that point will cause the valve to close prematurely and may also create undesirable unstable actions of the valve. Sensing at a pressure-stable location inside the tank is necessary. The internal sense tube must never dip into the liquid contents in the tank, and the tip configuration must be such that the flow from the main valve will not cause a suction effect in the pilot sense chamber. If this happens, the main valve will open longer than necessary and an overpressure condition may occur in the tank.

Whenever the pressure in the pressure sensing chamber is great enough to overcome the downward pressure of the set pressure spring 41, the pilot will close, which causes the dome pressure to equal to the inlet supply pressure. This in turn will close the main valve. Whenever the pressure in the pilot sense chamber drops below the set pressure, the set pressure spring 41 will exert a downward pressure to depress the pilot spindle 12 which will unseat the spindle seat 31 and a flow is created. This flow originates from the main valve body 27 inlet 51, flows through the pilot inlet tube 46, across the orifice 49, out through the spindle seat 31, down the pilot discharge tube 47, and into the tank via the main valve outlet port. A flow across the orifice 49 will cause a pressure drop on the downstream side. Since the dome volume is located between the orifice 49 and the spindle seat 31, any drop in pressure downstream of the orifice 49 will be reflected in the dome. As mentioned previously, a sufficient drop in dome pressure will cause the main valve piston 20 to open and allow blanket gas to flow into the tank. When the tank pressure rises enough to overcome the set pressure spring 41, the pilot will close and so will the main valve.

The present blanketing valve is not a pressure "regulator", it will open and close as needed to satisfy the setting of the set pressure spring 41. All regulators have a "dead band", and the opening and closing points of this device is equivalent to a dead band.

In the present device all pressure containing chambers are fully enclosed. No gas is discharged to the atmosphere during normal operation.

One of the important features of this device is the pressure balanced pilot spindle 12. Because very low pressures are dealt with in the pressure sensing chamber, coupled with varying, but relatively high, pressures in the dome volume (and therefore around the outside of the spindle 12), a spindle design that is not pressure balanced may move up or down depending on the direction of unbalance as the dome pressure varies. Therefore an unbalanced spindle may cause valve instability which is unacceptable. The spindle seat 31 of the present device seals at a diameter which is the same as the sealing diameter of the lower spindle seal 14. Additionally, the spindle 12 has a hole or holes 73 communicating pressure between the volume above the seat 31 with the cavity for the return spring 15. The spindle friction could impair the accuracy and/or repeatability of the set point. When the spindle 12 is depressed due to a drop in tank pressure, it does not matter whether the upper spindle seat 31 or the lower spindle seal 14 opens first. The cracking of the seal will equalize pressure between annular space 69 and head space 72 through either the communicating hole 73 in the spindle 12 or through the controlled clearance between the lower end of the spindle 12 and the adjacent connector 16, i.e., lip 59 on neck 70. The pressure balancing of the moving control member is very important in such a low pressure device.

Another feature in the pilot valve is the use of two support plates 5, one on each side of the diaphragm 6, to create a downward effective area equal to the upward effective area of the diaphragm 6. Under normal conditions only the support plate on top is necessary. However, if for some reason when the sense chamber pressure is falling and the spindle 12 is difficult to depress, resulting in no dome pressure reduction to open the main valve to add blanket gas to the tank, and the tank pressure goes to vacuum, a downward pressure is created by the vacuum acting on the diaphragm 6 to add to the pressure of the spring 41 to move the spindle 12. Without the lower support plate, or, if the lower plate is smaller, then the downward force created by vacuum in the sense chamber would be less than that obtainable with a larger plate. In such a contingency, more force is available to depress the spindle 12 which means the vacuum in the tank will be kept to a minimum before a positive blanket pressure is restored. Likewise, the valve should open whenever there is sufficient vacuum in the sense chamber even if the spring 41 is not set or it is broken. This is a safety feature to protect the tank from collapsing under vacuum without the need for the emergency vacuum breaker to open which will admit undesirable air from the atmosphere.

The invention claimed is:

1. A pressure balanced pilot valve comprising:
   a body having a chamber therein,
   an inlet and an outlet in fluid communication through said chamber,
   a neck extending rectilinearly into said chamber, said neck having an annular lip about the terminus thereof in said chamber,
   a spindle comprising:
      a hollow body, said hollow body being slidably mounted in said chamber on said neck,
      a rectilinear member extending from said chamber, said rectilinear member being operably associated with a pressure sensing means,
      a first annular seal positioned externally on said hollow body, proximal to said rectilinear member and aligned to operably engage a portion of the chamber to form a first fluid seal between said inlet and said outlet,
      a second annular seal positioned internally in said hollow body, distal to said rectilinear member and operably aligned to engage said annular lip and form a second fluid seal between said inlet and said outlet, and
      a port communicating the interior of said hollow body with said outlet, and
   a spring mounted in said hollow body tending to bias said seals to fluidly seal said inlet and outlet apart and to bias said rectilinear member toward said pressure sensing means whereby a reduction in pressure sensed by said pressure sensing means will unseat said seals and provide communication between said inlet and said outlet.

2. The pressure balanced pilot valve according to claim 1 wherein said seals have equal seating area, said seating areas being in fluid communication with one another through said spindle such that the force applied on either end of said spindle by a pilot gas is substantially equal at all times during operation.

3. The valve according to claim 1 wherein said means for sensing pressure comprises a flexible diaphragm mounted in a case and sealing said case.

4. The valve according to claim 2 wherein means for adjustment of the predetermined pressure is operably associated with said diaphragm.

5. In combination a pilot valve and a tank blanketing valve for maintaining a predetermined gas pressure in said tank comprising:
   (a) a main valve body having communicating gas inlet means and gas outlet means;
   (b) means for attaching said gas outlet means to a storage tank;
   (c) means for attaching said gas inlet means to a gas source;
   (d) a first bore in said main valve body intersecting between said gas inlet means and said outlet means whereby said inlet and outlet means communicate through said bore;
   (e) a connecting body mounted in said first bore and having a second bore therein;
   (f) a piston slidably mounted in said second bore and into said first bore;
   (g) a first biasing means tending to urge said piston into blocking and sealing position between said inlet and outlet means;
   (h) a cavity formed in said second bore by said piston;
   (i) a pressure balanced pilot valve mounted onto said connecting body and forming a chamber there-with, said chamber being in gaseous communication with the cavity,
an inlet and an outlet in fluid communication through said chamber,
a neck extending rectilinearly into said chamber, said neck having an annular lip about the terminus thereof in said chamber,
a spindle comprising:
  a hollow body, said hollow body being slidably mounted in said chamber on said neck,
  a rectilinear member extending from said chamber, said rectilinear member being operably associated with a pressure sensing means,
  a first annular seal positioned externally on said hollow body, proximal to said rectilinear member and aligned to operably engage a portion of the chamber to form a first fluid seal between said inlet and said outlet,
  a second annular seal positioned internally in said hollow body, distal to said rectilinear member and operably aligned to engage said annular lip and form a second fluid seal between said inlet and said outlet, and
  a port communicating the interior of said hollow body with said outlet, and
  a spring mounted in said hollow body tending to bias said seals to fluidly seal said inlet and outlet apart and to bias said rectilinear member toward said pressure sensing means whereby a reduction in pressure sensed by said pressure sensing means will unseat said seals and provide communication between said inlet and said outlet;
(j) a pilot gas inlet connecting said chamber to said gas source;
(k) a pilot gas outlet conduit connecting said chamber to said tank;
(n) a pressure sensing means operably abutting said spindle and
(o) a pressure sensing conduit connecting said pressure sensing means to said tank, whereby decreasing pressure in said tank below a predetermined pressure causes said pressure sensing means to depress said spindle and provide gaseous communication between said pilot gas discharge conduit and said cavity.

6. The combination according to claim 5 wherein said first biasing means comprises a spring.

7. The combination according to claim 6 wherein said pressure sensing conduit is positioned through said main valve body and said gas outlet means.

8. The combination according to claim 6 wherein said pressure sensing conduit is external of said valve.

9. The combination according to claim 6 wherein said spindle is stopped in said chamber to prevent response to increased tank pressure above predetermined pressure.

10. The combination according to claim 6 wherein said spindle is slidably aligned to block and seal gaseous communication between said pilot gas discharge conduit and said cavity at the predetermined tank gas pressure.

11. The combination according to claim 6 wherein said spindle is slidably aligned to provide gaseous communication between said cavity and said pilot gas discharge conduit at a tank pressure less than the predetermined gas tank pressure.

12. The combination according to claim 6 wherein said pressure sensing means comprises a flexible diaphragm mounted in a case and sealing said case, said case communicating with said tank via said pressure sensing conduit.

13. The combination according to claim 12 wherein said flexible diaphragm is clamped between a pair of plates extending over a portion thereof.

14. The combination according to claim 12 wherein means for adjustment of the predetermined pressure is operably associated with said diaphragm.

15. The combination according to claim 14 wherein said means for adjustment comprises a compressible spring mounted to said diaphragm external of said case and means to compress said spring.

* * * * *